US011482088B1

(12) United States Patent
Russo et al.

(10) Patent No.: US 11,482,088 B1
(45) Date of Patent: Oct. 25, 2022

(54) SYSTEM AND METHOD FOR CONTEXT AWARE ACCESS CONTROL WITH WEAPONS DETECTION

(71) Applicant: MOTOROLA SOLUTIONS, INC., Chicago, IL (US)

(72) Inventors: Pietro Russo, Melrose, MA (US); Mahesh Saptharishi, Sudbury, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/304,506

(22) Filed: Jun. 22, 2021

(51) Int. Cl.
*G05B 19/00* (2006.01)
*G08B 13/22* (2006.01)
*G08B 21/18* (2006.01)
*G08B 15/00* (2006.01)

(52) U.S. Cl.
CPC ............. *G08B 13/22* (2013.01); *G08B 15/00* (2013.01); *G08B 21/182* (2013.01)

(58) Field of Classification Search
CPC ....... G08B 13/22; G08B 15/00; G08B 21/182
USPC ........................................................... 340/5.2
See application file for complete search history.

(56) References Cited

U.S. PATENT DOCUMENTS 6,972,693 B2 12/2005 Brown et al.
7,212,113 B2 * 5/2007 Zanovitch ............ G08B 25/085 340/5.1
9,407,882 B2 * 8/2016 Artino .................... H04N 7/186
9,942,248 B1 * 4/2018 Umland .............. H04L 63/1425
2004/0012494 A1 * 1/2004 Lee ........................ G01V 3/104 340/551
2005/0063566 A1 * 3/2005 Beek ...................... H04N 7/186 348/E7.086
2005/0248450 A1 * 11/2005 Zanovitch .............. G08B 25/14 340/506
2008/0106405 A1 * 5/2008 Zanovitch .............. G08B 25/14 340/540
2012/0133482 A1 * 5/2012 Bhandari ................. G07C 9/27 340/5.2
2014/0226019 A1 * 8/2014 Artino ...................... G07C 9/15 348/156
2015/0248798 A1 * 9/2015 Howe .................. G08B 25/008 340/5.83
2016/0188980 A1 * 6/2016 Martin ................. G11B 27/005 382/103
2017/0124328 A1 * 5/2017 Krishnapura ........... G06F 21/57
2017/0294063 A1 * 10/2017 Hodge ................. H04N 13/204

(Continued)

FOREIGN PATENT DOCUMENTS

EP 2148217 B2 1/2010

*Primary Examiner* — Zhen Y Wu

(57) ABSTRACT

Techniques for context aware access control with weapons detection are provided. An indication of an identity of a person is received at an access control system. The indication of the identity of the person includes a confidence level of the identification. An indication of a threat level of the person is received at a threat detection system. The threat level including a confidence level of the threat level. At least one of an identification threshold or a threat level threshold is modified based on the threat level confidence level or the confidence level of the identification. At least one of allowing access, allowing access with an alarm indication, or denying access to the person is based in part on the modified identification threshold or threat level threshold.

20 Claims, 5 Drawing Sheets

(56) References Cited

U.S. PATENT DOCUMENTS

| | | | | |
|---|---|---|---|---|
| 2019/0171178 | A1* | 6/2019 | Burke | G06V 20/52 |
| 2020/0066071 | A1* | 2/2020 | Budman | G07C 9/28 |
| 2020/0168063 | A1* | 5/2020 | Chandler | G07C 9/28 |
| 2020/0410501 | A1* | 12/2020 | Tweneboah Kodua | G06Q 20/401 |
| 2021/0166538 | A1* | 6/2021 | Hill | G07C 9/00896 |

* cited by examiner

SYSTEM AND METHOD FOR CONTEXT AWARE ACCESS CONTROL WITH WEAPONS DETECTION

BACKGROUND

Access control systems may be used to restrict access to certain areas. Only people who are authorized to be in the restricted areas are granted access. Some access control systems are relatively straightforward, such as a badge reader coupled to an electronic door lock. Authorized personnel will be issued a badge that allows the door to be unlocked. Other access control systems can be more sophisticated, such as access control systems based on biometrics. Some example biometric access control systems include those based on fingerprints, palm scans, facial recognition, and iris scans. Access control based on biometrics may be more secure than a badge based systems, as it is much more difficult to forge/steal a biometric identifier.

Weapons detection systems may be used to identify people that are carrying weapons, either in the open or concealed. Some example weapons detection systems may be based on millimeter wave radar (60 Ghz-80 Ghz), higher frequency radar (200 Ghz-300 Ghz), visible spectrum cameras, multi-spectrum cameras, and backscatter x-rays. In some cases, the systems are sophisticated enough to not only detect the presence of weapons, but also to identify the type of weapon and location on the body. In addition, weapons detection systems may also include digital e-Nose smell detection to identify substances such as explosives.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
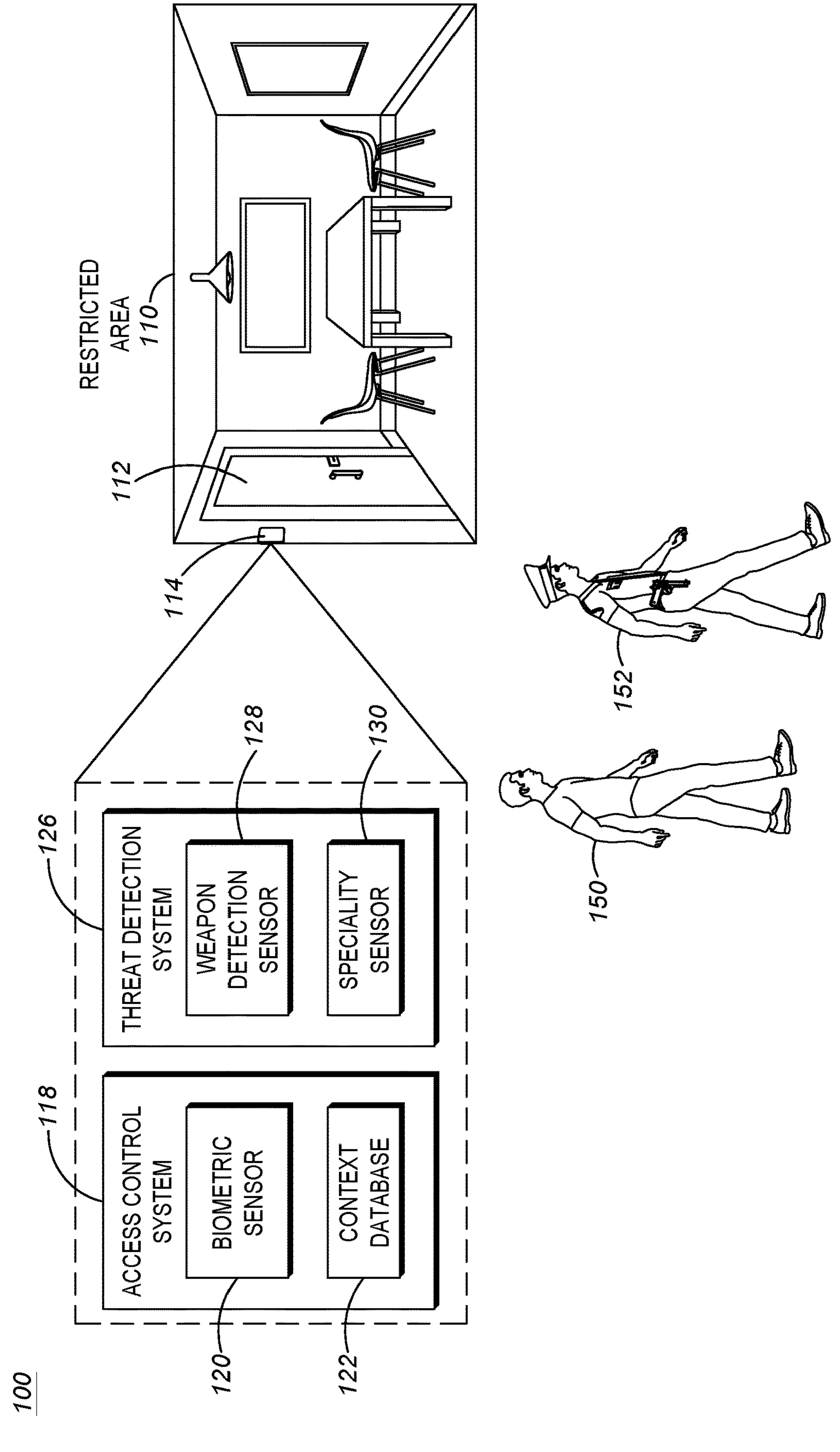
FIG. 1 is an example of a context aware access control with weapons detection system that is protecting a restricted area.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Access control systems based on physical items, such as a badge, are generally yes/no systems. A badge has an identifier that may be read by the badge reader and if that identifier is included in the list of identifiers allowed access, access may be granted; there is no ambiguity in the badge identifier. Access controls systems based on biometrics cannot be so definitive, as it would be very difficult to provide a biometric identifier that is as fixed as a badge identifier. For example, slight variance in pressure on a finger print reader may produce slightly different biometric readings. Alteration in facial position (e.g. slightly tilted, etc.) may cause slightly different biometric readings.

To overcome the problem that biometric readings may vary slightly from one reading to the next, biometric access control systems are generally based on confidence levels. For example, a biometric system may determine that a facial scan of a person matches a face stored in a database with a 70% confidence level, or that a fingerprint matches one on file with an 80% confidence level. The system may then have a threshold confidence level to determine a match. For example, a threshold confidence level may be 75%. If a biometric identifier presented (e.g. facial, fingerprint, etc.) matches a stored biometric identifier with a confidence level greater than the threshold, a match is declared.

Weapons detection systems may also operate on similar confidence level thresholds, rather than absolutes. For example, a weapons detection system may determine a person is carrying a handgun with a 65% confidence level. If that level is above the confidence level threshold, the system may trigger an alert saying the person is carrying a gun. Likewise, if below the confidence level threshold, no alert may be triggered.

As should be clear, the setting of the confidence level thresholds impacts the accuracy of the identification/detection. If the confidence level threshold is set very high (e.g. greater than 95%), it is very likely that the identification/detection is correct. In an access control system, depending on the nature of the area being protected, the confidence level threshold can be set accordingly. For example, if an access control system is protecting a highly sensitive area (e.g. nuclear weapons, critical infrastructure, etc.) the confidence level threshold may be set to be very high because the system wants to be as confident as possible before granting access. The downside of the potential for false negative matches (i.e. the person is actually authorized) may be tolerated because it is more important to ensure that only the proper people have access.

On the other hand, for less critical areas, the access control system confidence level threshold may be set lower if the inconvenience of false negatives outweighs the sensitivity of the area being protected. For example, an access control system that is protecting a standard, low risk, office environment may be set lower, as the consequences of an unauthorized person gaining access may be minimal and do not justify inconvenience that may be imposed on authorized people being incorrectly denied access.

Similar concerns exist within weapons detection systems. For areas that are highly sensitive (e.g. airports, etc.) the confidence level threshold may be set to be very low (e.g. 25%, etc.) because of the desire to detect anyone who is even suspected of carrying a weapon. The dangers of indicating that no weapon is present may greatly exceed the inconvenience imposed on people who are not actually carrying weapons (e.g. false positives).

Traditionally, there has been minimal interaction between access control systems and weapons detection systems. The interactions that do exist generally have each system perform their own determination and then communicate the result to the other system. For example, a weapons detection system may determine that a person is carrying a gun (e.g. exceeds the pre-set confidence threshold). The access control system may then be sent this result to determine if the person is authorized to be carrying the gun (e.g. database lookup of the person's identity profile). If the person is listed as authorized to carry a gun, access may be granted.

The techniques described herein further enhance both access control systems and weapons detection systems by allowing the systems to communicate with each other to dynamically alter the confidence level thresholds of one system based on the other. The thresholds may also be modified based on the context of a person utilizing the systems. For example, consider the case of an armed security guard at a low risk office building. The access control system may indicate the security guard is allowed to carry a gun. The access control system may be nominally set with a low confidence level threshold of 60% in order to minimize the inconvenience that false negatives may cause. When the weapons detection system detects the presence of a gun, it may cause the access control system to increase its confidence level threshold to a higher value (e.g. 95%, etc.).

In essence the access control system is told that the guard is carrying a gun, so it needs to be as certain, with a very high level of confidence, that the person is properly identified. In addition, triggering of alerts could also be based on user context. For example, the security guard may have been positively identified via the higher confidence level threshold, is carrying a weapon, and is authorized to carry a weapon. However, contextual information about the security guard may indicate it is his day off and he should not be in the building. In such a case, access may still be granted, but an alert may be raised. Further detailed examples of altering confidence level thresholds based on context are provided below.

A method is provided. The method includes receiving, at an access control system, an indication of an identity of a person, the indication of the identity of the person including a confidence level of the identification. The method further includes receiving, at a threat detection system, an indication of a threat level of the person, the threat level including a confidence level of the threat level. The method further includes modifying at least one of an identification threshold based on the threat level confidence level or a threat level threshold based on the confidence level of the identification. The method further includes at least one of allowing access, allowing access with an alarm indication, or denying access to the person based in part on the modified identification threshold or threat level threshold.

In one aspect, modifying the at least one of the identification threshold and threat level threshold further comprises modifying the at least one of the identification threshold and threat level threshold based on a context associated with the person. In one aspect. the method further includes raising the identification threshold when it is determined the person has exceeded a default threat level threshold. In one aspect, the threat detection system comprises a weapons detection system.

In one aspect, the method includes raising the threat level threshold when it is determined the person has been identified with high confidence and is determined to be carrying a prohibited weapon. In one aspect, the method includes lowering the threat level threshold when it is determined the person has been identified with high confidence and is determined to not be carrying an expected weapon. In one aspect, the method includes lowering the identification threshold when it is determined the person has been identified with a high confidence level as not carrying a weapon.

A system is provided. The system includes a processor and a memory coupled to the processor. The memory containing a set of instructions thereon that when executed by the processor cause the processor to receive, at an access control system, an indication of an identity of a person, the indication of the identity of the person including a confidence level of the identification. The instructions further cause the processor to receive, at a threat detection system, an indication of a threat level of the person, the threat level including a confidence level of the threat level. The instructions further cause the processor to modify at least one of an identification threshold based on the threat level confidence level or a threat level threshold based on the confidence level of the identification. The instructions further cause the processor to at least one of allow access, allow access with an alarm indication, or deny access to the person based in part on the modified identification threshold or threat level threshold.

In one aspect, the instructions to modify the at least one of the identification threshold and threat level threshold further comprises instructions to modify the at least one of the identification threshold and threat level threshold based on a context associated with the person. In one aspect, the instructions further cause the processor to raise the identification threshold when it is determined the person has exceeded a default threat level threshold. In one aspect, the threat detection system comprises a weapons detection system.

In one aspect, the system further comprises instructions to raise the threat level threshold when it is determined the person has been identified with high confidence and is determined to be carrying a prohibited weapon. In one aspect, the system further comprises instructions to lower the threat level threshold when it is determined the person has been identified with high confidence and is determined to not be carrying an expected weapon. In one aspect, the system further comprises instructions to lower the identification threshold when it is determined the person has been identified with a high confidence level as not carrying a weapon.

A non-transitory processor readable medium containing a set of instructions thereon. The instructions on the medium, that when executed by a processor, cause the processor to receive, at an access control system, an indication of an identity of a person, the indication of the identity of the person including a confidence level of the identification. The instructions on the medium further cause the processor to receive, at a threat detection system, an indication of a threat level of the person, the threat level including a confidence level of the threat level. The instructions on the medium further cause the processor to modify at least one of an identification threshold based on the threat level confidence level or a threat level threshold based on the confidence level of the identification. The instructions on the medium further cause the processor to at least one of allow access, allow access with an alarm indication, or deny access to the person based in part on the modified identification threshold or threat level threshold.

In one aspect, the instructions on the medium to modify the at least one of the identification threshold and threat level threshold further comprises instructions to modify the at least one of the identification threshold and threat level threshold based on a context associated with the person. In one aspect, the instructions on the medium further comprise instructions to raise the identification threshold when it is determined the person has exceeded a default threat level threshold.

In one aspect, the instructions on the medium further comprise instructions to raise the threat level threshold when it is determined the person has been identified with high confidence and is determined to be carrying a prohibited weapon. In one aspect, the instructions on the medium further comprise instructions to lower the threat level threshold when it is determined the person has been identified with high confidence and is determined to not be carrying an expected weapon. In one aspect, the instructions on the medium further comprise instructions to lower the identification threshold when it is determined the person has been identified with a high confidence level as not carrying a weapon.

Further advantages and features consistent with this disclosure will be set forth in the following detailed description, with reference to the figures.

FIG. 1 is an example of a context aware access control with weapons detection system that is protecting a restricted area. Environment 100 may include a restricted area 110. The particular reason the area is restricted is relatively unimportant. What should be understood is that access to the restricted area 110 is controlled by an access control system, whose operation is described in further detail below. Access to the restricted access area 110 may be limited via the use of a physical barrier 112 that can be opened or closed by the access control system. Example barriers may include doors with electronic locks, gates, bars, turnstiles, etc. In some cases, there may not be a physical barrier, but rather an alarm that sounds if an unauthorized person enters a restricted area 110 without authorization from the access control system. Although restricted area 110 is depicted as a room, this is for purposes of description only. The restricted area could be a room, a building, an enclosed area (e.g. military base), a facility, or any other area. What should be understood is that restricted area 110 can be any area that has access controlled by an access control system.

Access to the restricted area 110 may be controlled via a context aware access control with weapons detection system 114. The context aware access control with weapons detection system 114 may comprise two high level functions, access control and threat detection that are communicatively coupled, and described in further detail below.

Access control system 118 may control access to a restricted area 110 via biometrics. The access control system 118 may include biometric sensors 120 that may be used to sample biometric properties of a person wishing to enter the restricted area 110. Examples of biometric properties may include fingerprints, palm prints, facial scans, iris scans, or any other type of biometric identifier. As explained above, if a biometric identifier presented by a person matches an authorized profile stored in the access control system database (not shown) with a confidence level that exceeds a confidence level threshold, access to the restricted area may be granted. Although several types of biometric technologies have been described, it should be understood that the techniques described herein may be utilized with any access control system that uses a confidence level threshold to determine if a person is properly identified.

The access control system 118 may also include a context database 122. Context database 122 may include information about people who are attempting to access the restricted area 110 that is not directly identity related. For example, context could include things such as employee work schedules (e.g. is the person scheduled to be in the office, etc.), location information (e.g. a police officer may carry a device that reports his location), normal weapon placement (e.g. Officer Smith normally carries a handgun on his right hip), etc. Some of the context information may be learned by the system over time. For example, initially the system may not know where Officer Smith carries his gun, but after several interactions with the system where the gun is on Officer Smith's right hip, the system may determine that this is the usual location for Officer Smith to carry his weapon.

Threat detection system 126 may be used to detect weapons on a person, identify the type of weapon, and identify where on the body the person is carrying the weapon. Weapons detection sensor 128 may take many forms. As explained above, there are many different technologies that may be utilized to detect weapons. The techniques described herein are not dependent on any particular technology used. What should be understood is that any weapons detection technology that uses a confidence level threshold may be utilized with the techniques described herein.

Threat detection system 126 may also include specialty sensors 130. For example, a specialty sensor 130 may be a digital e-nose used to detect explosives by smell. Another type of specialty sensor 130 may be a radiation detector that can be used to detect dirty bombs. Yet another type of specialty sensor 130 may be a sensor used to detect biological threats. The techniques described herein are not limited to any particular type of sensor for the detection of any particular threat type.

Although access control system 118 and threat detection system 126 are depicted as two separate systems, this is simply for ease of description and the techniques describe herein are not so limited. Also, for ease of description, threat detection system and weapons detection system are used interchangeably, as the items detected by the specialty sensors 130 may also be considered weapons. Access control system 118 and threat detection system 126 may be separate systems communicatively coupled in order to affect each other's confidence level thresholds, or may be a singular system that integrates the functionality of access control and weapons detection. An example computing device on which the access control and weapons detection functionality may be implemented is depicted with respect to FIG. 5.

In operation, the access control system 118, using the biometric sensors 120, provides an identity with a confidence level. In other words, it provides an indication that a person presenting their biometric parameters matches a stored identity with a certain confidence level. In addition, the access control system may provide an indication of if the profile of the identity indicates if they are allowed to carry a weapon. In some cases, the profile may also include they type of weapon they are allowed to carry, where on their person they typically carry the weapon, and other such contextual information. The access control system may compute an access score based on the confidence level and contextual data.

The threat detection system 126 utilizes weapons detection sensors 128 and specialty sensors 130 to identify weapons carried by a person attempting to enter the restricted area 110. Detecting weapons can include detecting the number, type, and location on the body of such weapons. This determination can be made with a certain confidence level. The weapons detection system 126 may compute a threat score based on the confidence level and contextual data.

Based on the access score and the threat score, one of several example outcomes may result. 1) The user may be denied entry as their identity is not able to be sufficiently confirmed. 2) The user may be denied entry with an alarm generated. For example, not only was the user not identified, he was trying to enter while carrying a weapon. 3) The user may be granted access. 4) The user may be granted access with an alarm generated. For example, a user is positively identified and is authorized to enter the restricted area 110 and is authorized to carry a gun, but is carrying the gun in an atypical location.

To aid in the understanding of modifying confidence level thresholds, several example, scenarios will be presented. It should be understood that this is not intended to be an exhaustive list, but instead is provided to explain how modification of confidence level thresholds of access control systems based on confidence level thresholds of weapons detection systems (and vice versa) along with contextual information can improve security while also providing for reduced inconvenience from false positives or false negatives.

In one example use case, assume restricted area 110 is a location, such as an office complex or a school, and access control system 118 is a facial recognition system. Assume that the access control confidence level threshold is set to a default of 80%, meaning that if the person attempting to access the restricted area 110 can be identified with a confidence level above 80%, they will be granted access. Assume an office worker 150 attempts to access the restricted area 110 and is recognized with an 85% confidence level and is not detected as carrying a weapon. In such a case, the office worker 150 may simply be granted access, with no further alarm, as there would be no need for an elevated access score or threat score. In some implementations, if the weapons detection system determines that the person is not carrying a weapon with a sufficiently high threat score, the access control system may lower the identification threshold. The reason behind this being it is ok to be less certain of the person's identify because they are more certain to not be carrying a weapon.

Continuing with the use case, assume that armed police officer 152 is attempting to enter the restricted area 110. The threat detection system 126 may detect that police officer 152 is carrying a weapon, because the confidence level of weapon detection has exceeded a default threat level threshold, resulting in an elevated threat score. The access control system may have already identified the police officer 152 with a confidence level of 80%. Because the threat detection system 126 has detected the presence of a weapon, the access control system 118 determines if the user is authorized to carry a gun. If police officer 152 is authorized to carry a gun, the access control system may raise the confidence level threshold to an even higher percentage (e.g. 95%, etc.). In other words, because police officer 152 has an increased threat score (due to the presence of the weapon), the system needs to be very sure that the police officer 152 has been correctly identified.

Continuing with the police officer 152 example, assume that contextual information 122 for this officer indicates he normally carries his weapon on his right hip, but the weapons detection system 126 has detected the weapon in a different location. Because the weapon was detected and the police officer is authorized to carry a weapon, the identity confidence threshold may be increased as above. However, the threat score may increase as well, as the weapon is not located in the expected location and this may trigger an alarm condition. The alarm condition may trigger a contact with the police officer 152 by security personnel to determine why the officer's weapon is in an atypical location, prior to granting access.

Continuing with the example, again assume that police officer 152 is detected as carrying a weapon, which results in an increase in the threat score and corresponding increase in the confidence level threshold for confirming identity. Assume that the access control system is able to confirm the identity with high confidence (e.g. 95%). Assume the weapons detection system is able to identify that the person is carrying a prohibited weapon (e.g. machine gun, explosive device, body armor, etc.) or that the weapon is detected in an odd location (e.g. back of the head is more likely a surgical implant than a weapon). Typically, because prohibited weapons pose an even bigger threat, because no one is authorized to carry them, the threat level threshold may be set relatively low, because it is desired to detect if there is even the possibility of the presence of these prohibited items (e.g. false negatives are tolerated).

However, because police officer 152 has been substantially positively identified and is authorized to carry weapons, the threat level threshold of the weapons detection system 126 for prohibited weapons may be raised. In other words, because the system is very sure that it has properly identified police officer 152 as being authorized to carry weapons, the threat level threshold for prohibited weapons can be increased in order for the weapons detection system 126 to be sure it has actually detected a prohibited weapon. By increasing this threshold, the likelihood of inconveniencing police officer 152 with a false positive is reduced. It should be understood that in some implementations, the exact opposite may occur. Detection of a prohibited weapon by a person authorized to carry a weapon may cause the threat level threshold to be reduced, as it may be considered highly suspicious for a person who should know which weapons are authorized, to be carrying an unauthorized weapon. In some cases, such a situation may trigger an alarm, where the officer is still granted access, but may require contact with security personnel first.

Although the previous scenarios described changing thresholds based on presence of a weapon, the absence of a weapon could also trigger a change in confidence level thresholds. For example, assume police officer 152 is authorized to carry a gun and contextual information indicates he normally carries his gun on his right hip. Police officer 152 may be identified with a default identity threshold and the weapons detection system may detect that no weapons are present because no weapon was detected above the threat level threshold. The fact that the police officer 152 is not carrying a weapon that is expected could be a suspicious condition in and of itself (e.g. officer has been taken hostage with his own gun and is being forced to provide entry to the restricted area). In such a case, the threat level threshold may be lowered in order to make sure that the police officer 152 is truly not carrying an expected weapon. In some implementations, the system may still grant access to the police officer, but may trigger an alarm for security to follow up and find out why police officer 152 is not carrying his expected weapon.

It should further be noted that although all the examples described above have been in terms of a person attempting to enter a restricted area, the techniques are also applicable to a person attempting to leave a restricted area with a prohibited weapon. For example, the restricted are may be an evidentiary weapons storage locker. A person would typically not be removing a weapon from such an area unless they were specifically authorized. The system described above could be used to detect an unauthorized person attempting to leave a restricted area with a weapon and initiate a lockdown.

It should further be noted that in some cases, the system may cause other identification methods to be used. For example, if a person authorized to carry weapons is identified with a very high confidence level, but is also detected with a prohibited weapon, the system may determine that verification of the identify may require multi factor authentication. In addition to the biometric identifier, the person may be asked to present another identifier, such as a badge, mobile token, etc.).

Figure 2:
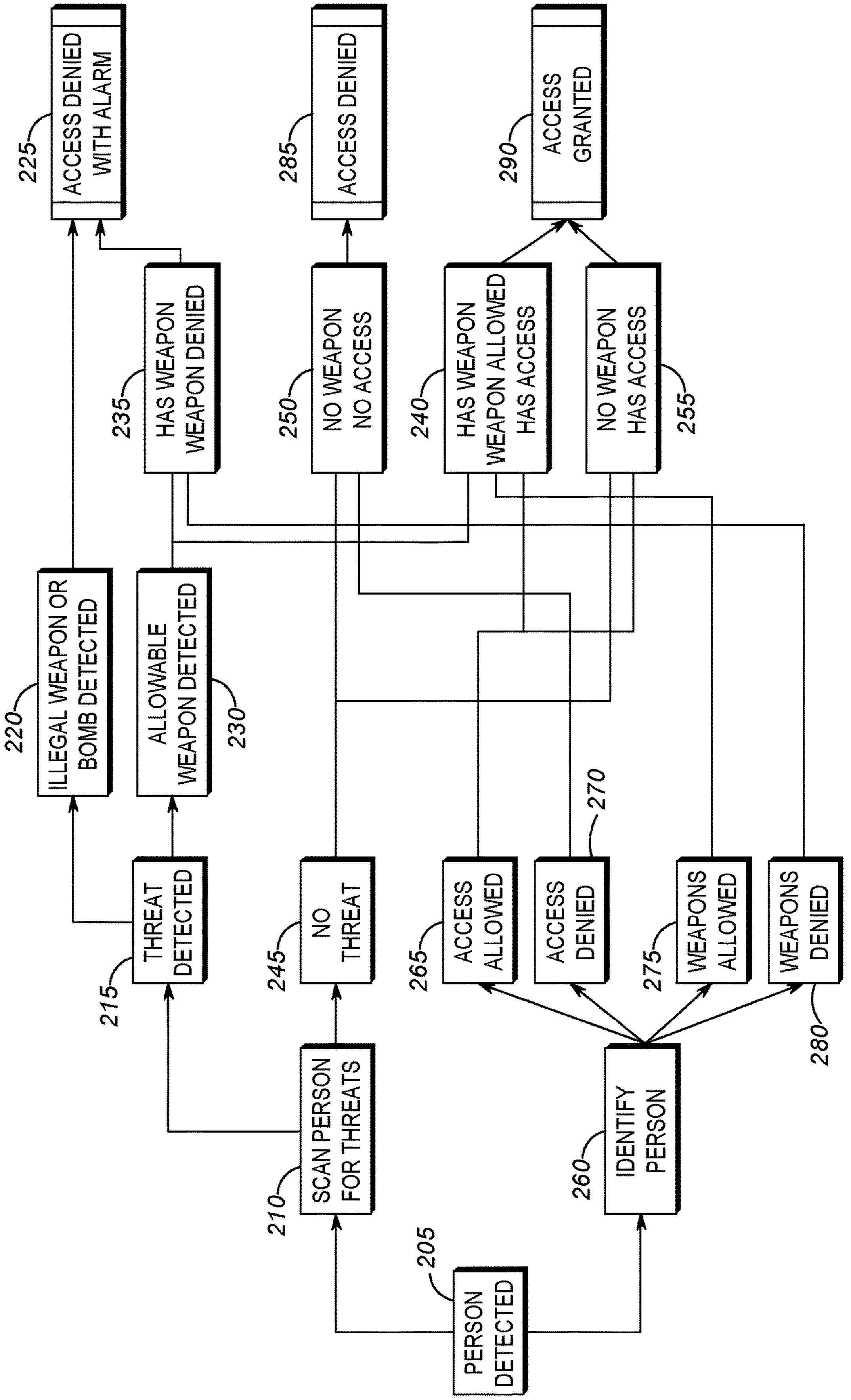
FIG. 2 depicts an example state diagram for a traditional access control and threat detection system.

FIG. 2 depicts an example state diagram for a traditional access control and threat detection system. In the diagram in FIG. 2, the thresholds are not modified. Improvements to this traditional system utilizing the techniques described herein are described with respect to FIG. 3.

In block 205, a person is detected. For example, the person may be attempting to access restricted area 110 via context aware access control with weapons detection system 114. The person may be scanned 210 for threats via the threat detection system 126. If a threat is detected, the process may move to block 215, where it is determined if a threat is something that is always prohibited, such as an illegal weapon or a bomb 220. If so, the process moves to block 225, wherein access is denied and an alarm is generated. The reason for this being in a traditional system, the detection of a prohibited weapon itself is enough to deny entry and cause an alarm.

If it is determined in block 230 that the weapon is allowable, the process moves to either block 235 or block 240 which are both states that handle a person who has been determined to be carrying an allowable weapon. If in block 245, it is determined that the person does not pose a threat, the process moves to either block 250 or 255, which are both states that deal with a person who is not carrying weapons. The decision to grant/deny access is based on the identification of the person, as will be described further below.

In block 260, the person may be identified. For example, access control system 118 may be used to obtain a biometric identifier of the detected person to use in identifying the person. If the person is identified and is allowed access in block 265, the process moves to block 240 or block 255, which are both states that handle detected persons who are allowed access. If the person is determined to not have access in block 270 (e.g. can't be identified, can be identified but is for other reasons not allowed access, etc.) the process moves to block 250, which is a state that handles people who do not have access.

If it is determined in block 275 that the person is allowed to carry a weapon (e.g. police officer, armed security guard, etc.) the process moves to block 240. If it is determined in block 280 that the person is not allowed to carry a weapon, the process moves to block 235.

If the process arrives at block 235, this means that the person is carrying a weapon and is indicated as not being allowed to carry a weapon. The process then moves to block 225 where access is denied and an alarm is generated. A person carrying a weapon who is not authorized to carry a weapon may be a threat that needs to be investigated further, rather than just denying access, hence the alarm indication.

If the process arrives at block 250, this means the person is not carrying a weapon but also has no access to the restricted area. The process moves to block 285, wherein access is denied. There is no need to indicate an alarm, as this is simply the access control system preventing access to people who should not have access.

If the process arrives at block 240, this means the person has a weapon, is allowed to have a weapon, and has access to the restricted area. For example, this may be the case of the armed police officer. If the process arrives at block 255, this means the person has access to the restricted area and is not carrying a weapon. In both of these cases, the person is authorized to enter the restricted area, and access is granted in block 290.

Figure 3:
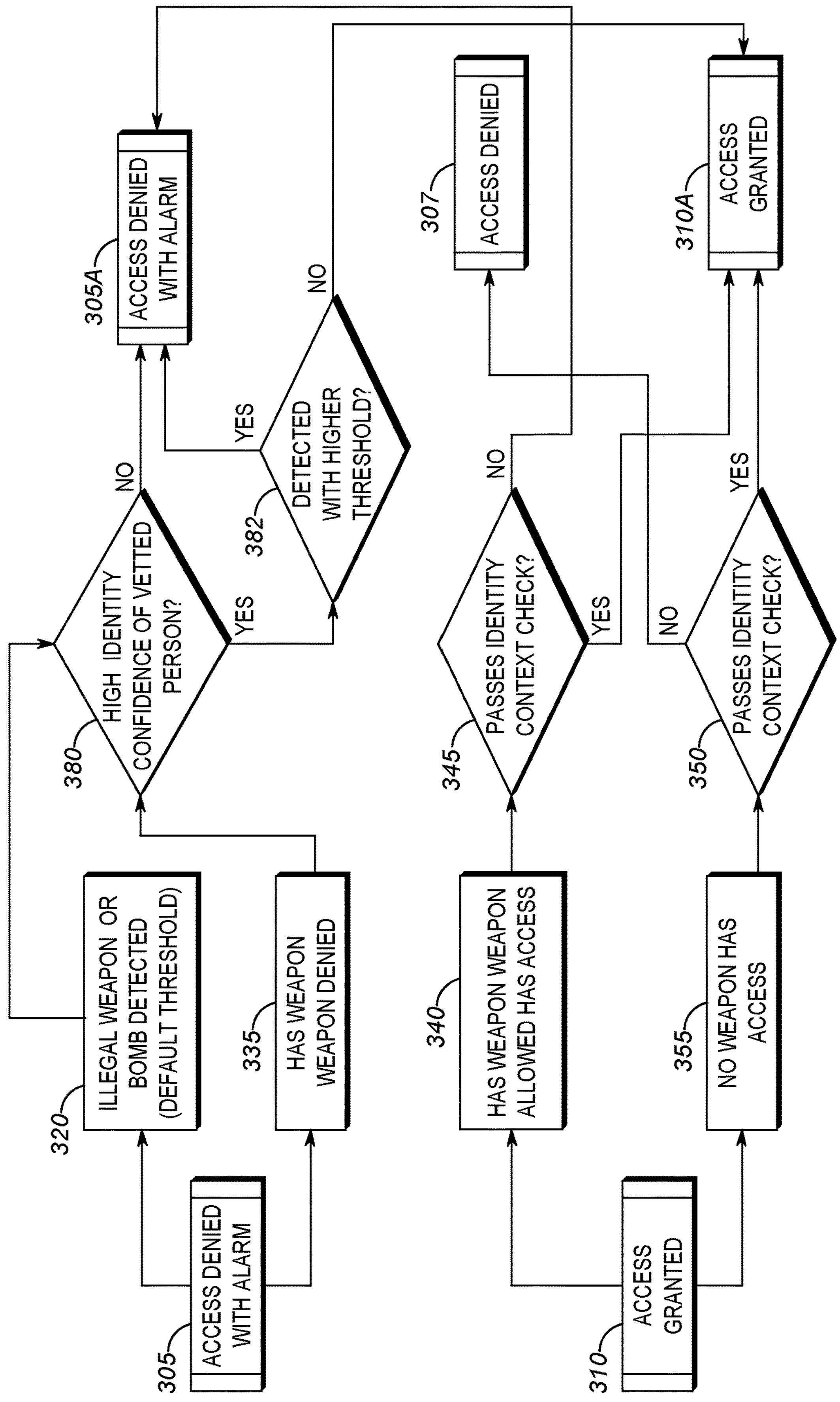
FIG. 3 depicts a state diagram for the context aware access control with weapons detection system according to the techniques described herein.

FIG. 3 depicts a state diagram for the context aware access control with weapons detection system according to the techniques described herein. The diagram in FIG. 3 depicts improvements to the traditional access control and threat detection systems by allowing for adjustment of the confidence level thresholds. These techniques may be applicable to when access is denied, with an alarm 305 (indicating further investigation is necessary) or when access is granted 310.

Blocks 320 and 335 are the equivalent of blocks 220 and 235 in FIG. 2. However, instead of going directly to denying access and indicating an alarm, the process moves to block 380. In block 380, it may be determined if there is high confidence in the identity of the person. For example, this may be achieved by raising the identification confidence level threshold to a higher value. If the person cannot be identified with higher confidence, the original decision in block 305 stands, and the person is again denied access with an indication of an alarm 305A.

However, if the person can be identified with high confidence, the process moves to block 382, where the threat level detection threshold may be raised to a higher level. If the system detects that the threat still exists, even when detected with a high threshold, this means it is likely that the person is carrying a weapon and is not authorized or the weapon is prohibited. The original decision in block 305 should stand.

If the prohibited weapon is not detected with the higher threshold, this means that the original detection may be a false positive. Since the system is sure this person is a person with access with a high level of confidence and did not detect a prohibited weapon with the higher level of confidence, the original decision in block 305 should be reversed and the person should be granted access 310A.

In addition to adjusting the identification and threat level thresholds, the system may also make additional decisions based on context of the identified person. For example, in block 340, the person is detected as having a weapon, is allowed to have a weapon, and has access. A context check could be performed. For example, context could be the person's current location, work schedule, weapons placement, weapon type, etc. It should be understood that this is not intended to be an exhaustive list of contexts, but rather simply examples.

For example, assume that the person is a police officer and the officer's radio utilizes GPS to report the officer's physical location. A context check in block 345 may compare the officer's GPS reported location with the location of the access control system. If they are not the same, this means that the person presenting themselves to the access control system is likely not the identified police officer, and a misidentification has occurred. The process may move to block 305A, where access denied and an alarm is generated. If the context check in block 345 passes, the original decision to grant access 310A is maintained.

In block 355, it may have been determined that the person is not carrying a weapon and does have access. A context check for the identified person 350 may be performed. For example, the context may be a work schedule. If the person is scheduled to be at that location, the context check passes, the original decision to grant access stands 310. However, if the person is not scheduled to be at the location at that time, the check fails. The person may be denied access 307. There is no need to indicate an alarm condition, as the person was determined to not be carrying a weapon and as such is not a threat. Simply denying access to the restricted area is sufficient.

Figure 4:
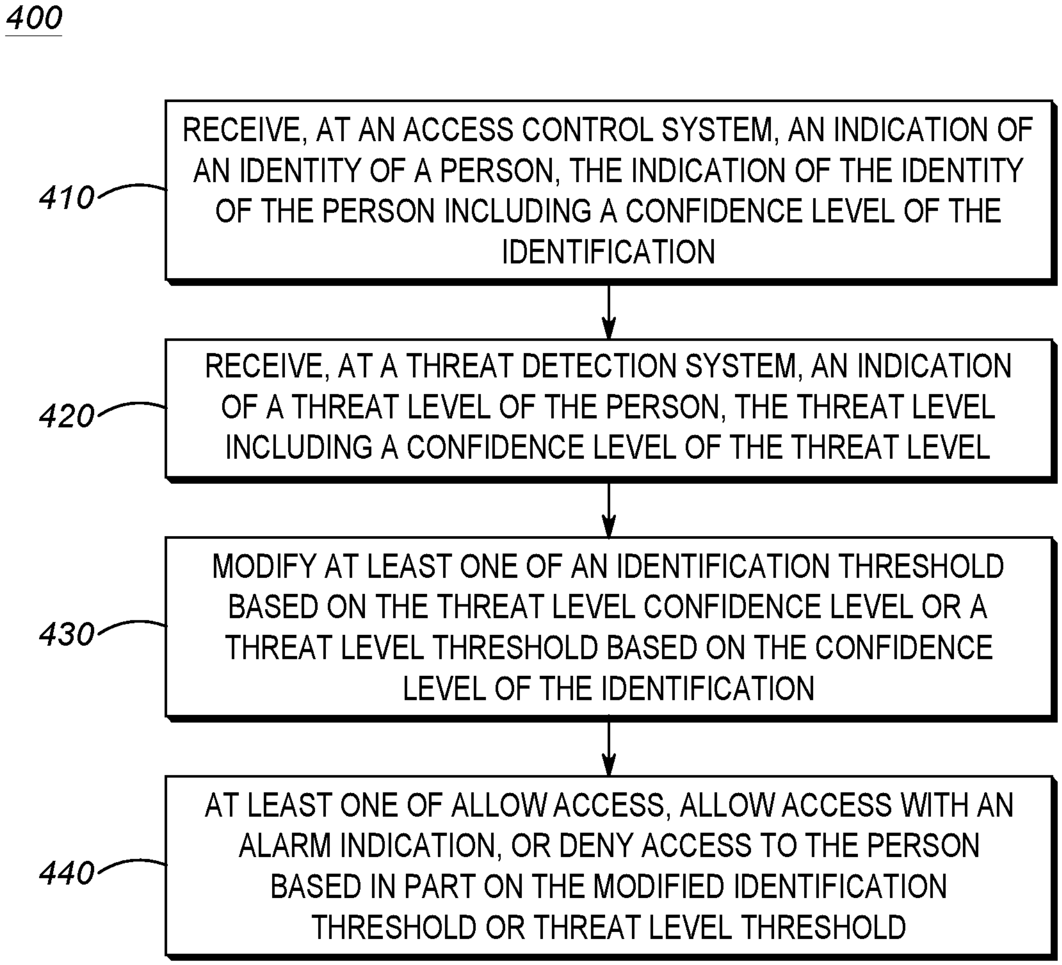
FIG. 4 is an example high level flow diagram for implementing the context aware access control with weapons detection techniques described herein.

FIG. 4 is an example high level flow diagram for implementing the context aware access control with weapons detection techniques described herein. In block 410, an indication of an identity of a person may be received at an access control system. The indication of the identity of the person including a confidence level of the identification. For example, the access control system may be a biometric based access control system. A person attempting to pass through the access control system may present a biometric identifier (e.g. fingerprint, palm scan, iris scan, facial recognition scan, etc.).

The access control system may then determine if the offered identifier matches any that are currently stored within the system. As a 100% match of a biometric identifier is very difficult to achieve, the system may set a confidence level of the match. As explained above, the system may have a threshold confidence level. When the confidence of the match exceeds the threshold, the system determines that the person presenting the biometric identifier is the same person whose records are stored in the system.

In block 420, an indication of the threat level of a person may be received at a threat detection system. The threat level may be based on if the person is carrying a weapon, the type of weapon, the location on the body of the weapon, if the weapon is prohibited, etc. The threat level could be based on if the person is carrying explosives, radioactive materials, biological threats, etc. Just as with identification, the threat detection system may include a confidence level of the threat level. For example, the system may indicate that the person is carrying a gun with a certain confidence level. If that confidence level exceeds a threat level threshold, then the person may be determined to be carrying a gun.

In block 430, at least one of an identification threshold is modified based on the threat level confidence level or a threat level threshold is modified based on the confidence level of the identification. As described above, the access control system and threat detection system may each have default confidence thresholds to determine a biometric match exists or that a weapon has been detected. As explained in the scenarios above, the thresholds in one system may be modified by the confidence level of the other system. (e.g. if a weapon is detected with the default confidence level, the identification threshold should be set higher to be sure the person is properly identified).

It should be understood that the techniques described herein are not limited to any particular type of thresholds modification. Modifications can include raising or lowering both thresholds, raising one threshold while lowering the other, keeping one threshold constant while modifying the other, or any other combination thereof.

In block 440, based in part on the modified identification threshold or threat level threshold, the person may be at least one of allowed access, allowed access with an alarm indication, or denied access. Allowing access allows the person to enter the restricted area. Denying access prevents the person from entering the restricted area.

Allowing access with an alarm indication may grant the person access to the restricted area, but may trigger additional levels of scrutiny. There could be different levels of alarms. For example, there may be soft alarms, which simply require some human verification. For example, a police officer carrying his gun in an atypical location may trigger an alarm for security personnel to follow up with the officer to determine why he is carrying his gun in a different location. In some cases, the soft alarm may simply be something that is logged and may be used at a later time if an incident occurs.

In some cases, the alarm indication may be much stronger. For example, if a prohibited weapon (e.g. explosive, etc.) is detected with a high confidence level, the alarm indication may be more severe. This may require delaying the access to the person until security personnel can verify why the person is carrying a prohibited weapon. In some implementations, a full lockdown of the facility may occur when a prohibited weapon is detected with high confidence.

Figure 5:
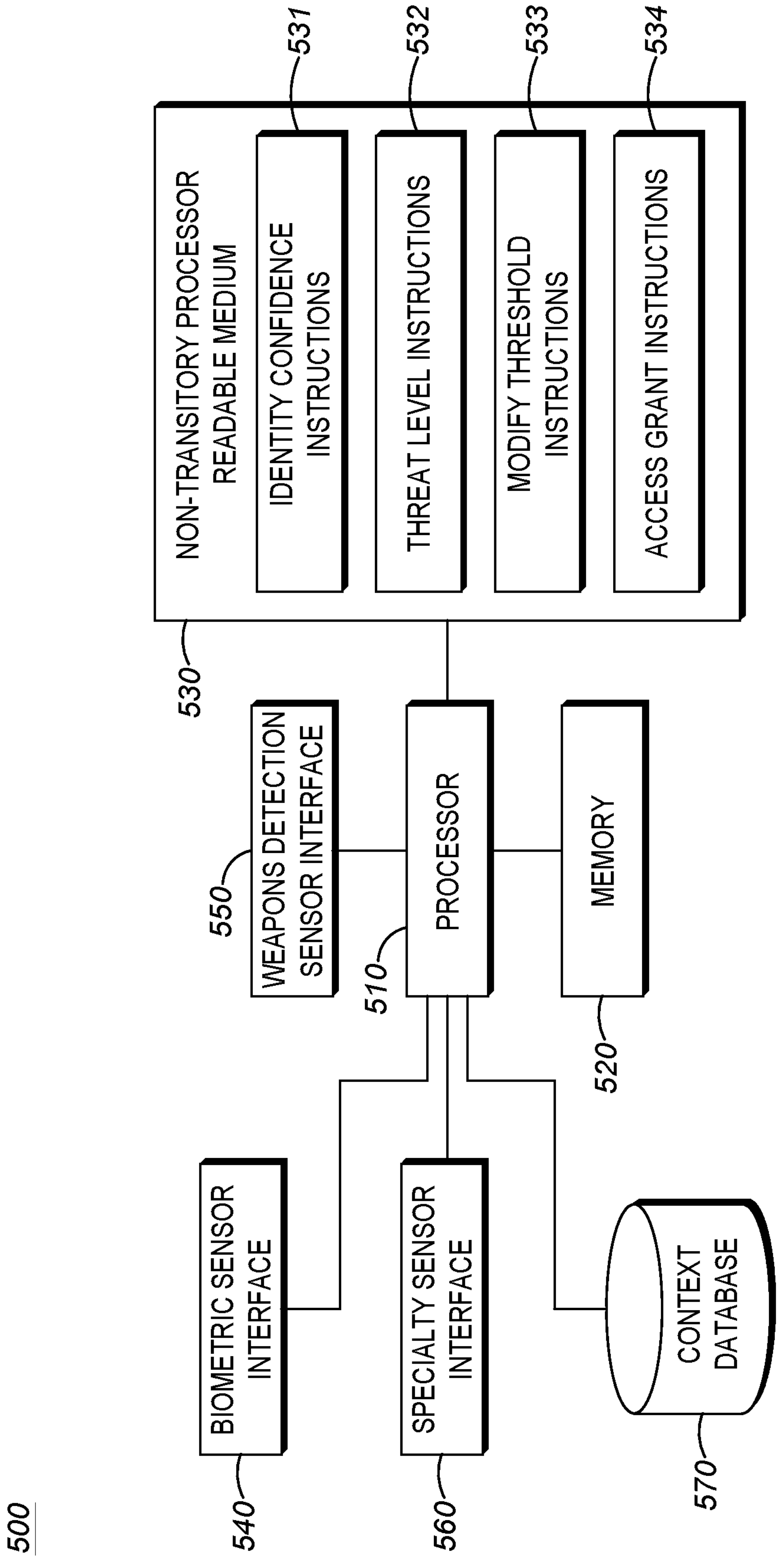
FIG. 5 is an example of a device that may implement the context aware access control with weapons detection techniques described herein.

FIG. 5 is an example of a device that may implement the context aware access control with weapons detection techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. access control system, threat detection system, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, biometric sensor interface 540, weapons detection sensor 550 interface, specialty sensor interface 560, and context database 570.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include identity confidence instructions 531. The identity confidence instructions 531 may cause the processor to utilize the biometric sensor interface 540 to obtain a biometric identifier from a person attempting to access a restricted area. The received biometric identifier may be compared to those stored within the system (not shown) to determine if there is a match with any existing record, and the confidence level of that match. The identity confidence instructions 531 are described throughout the specification generally, including places such as the description of block 410.

The medium 530 may also include threat level instructions 532. The threat level instructions 532 may cause the processor to utilize the weapons detection sensor interface 550 and specialty sensor interface 560 to identify any threats, such as weapons, that are being carried by the person. The information received from the sensors may be used to determine threats such as type of weapon being carried, location of the weapon, is the weapon always prohibited, etc. The threat level instructions 532 are described throughout the specification generally, including places such as the description of block 420.

The medium 530 may also include modify threshold instructions 533. The modify threshold instructions 533 may cause the processor to modify the threat level threshold and/or the identification threshold based on the opposite threshold. For example, the identification threshold may be raised based on the threat level threshold. The modify threshold instructions 533 are described throughout the specification generally, including places such as the description of block 430.

The medium 530 may also include access grant instructions 534. The access grant instructions 534 may cause the processor to determine if the person should be granted access to a restricted area, denied access to the restricted area, or granted or denied access to the restricted area while also generating an alarm. The access grant instructions 534 are described throughout the specification generally, including places such as the description of block 430.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot detect weapons using sensors and perform biometric identification using sensors, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:

receiving, at an access control system, an indication of an identity of a person, the indication of the identity of the person including a confidence level of the identification;

receiving, at a threat detection system, an indication of a threat level of the person, the threat level including a confidence level of the threat level;

modifying at least one of an identification threshold based on the threat level confidence level or a threat level threshold based on the confidence level of the identification; and at least one of allowing access, allowing access with an alarm indication, or denying access to the person based in part on the modified identification threshold or threat level threshold.

2. The method of claim 1 wherein modifying the at least one of the identification threshold and threat level threshold further comprises:

modifying the at least one of the identification threshold and threat level threshold based on a context associated with the person.

3. The method of claim 1 further comprising:

raising the identification threshold when the person has exceeded a default threat level threshold.

4. The method of claim 1 wherein the threat detection system comprises a weapons detection system.

5. The method of claim 4 further comprising:

raising the threat level threshold when the person has been identified with high confidence and is determined to be carrying a prohibited weapon.

6. The method of claim 4 further comprising:

lowering the threat level threshold when the person has been identified with high confidence and is determined to not be carrying an expected weapon.

7. The method of claim 1 further comprising:

lowering the identification threshold when the person has been identified with a high confidence level as not carrying a weapon.

8. A system comprising:

a processor; and a memory coupled to the processor, the memory containing a set of instructions thereon that when executed by the processor cause the processor to:

receive, at an access control system, an indication of an identity of a person, the indication of the identity of the person including a confidence level of the identification;

receive, at a threat detection system, an indication of a threat level of the person, the threat level including a confidence level of the threat level;

modify at least one of an identification threshold based on the threat level confidence level or a threat level threshold based on the confidence level of the identification; and at least one of allow access, allow access with an alarm indication, or deny access to the person based in part on the modified identification threshold or threat level threshold.

9. The system of claim 8 wherein the instructions to modify the at least one of the identification threshold and threat level threshold further comprises instructions to:

modify the at least one of the identification threshold and threat level threshold based on a context associated with the person.

10. The system of claim 8 further comprising instructions to:

raise the identification threshold when the person has exceeded a default threat level threshold.

11. The system of claim 8 wherein the threat detection system comprises a weapons detection system.

12. The system of claim 11 further comprising instructions to:

raise the threat level threshold when the person has been identified with high confidence and is determined to be carrying a prohibited weapon.

13. The system of claim 11 further comprising instructions to:

lower the threat level threshold when the person has been identified with high confidence and is determined to not be carrying an expected weapon.

14. The system of claim 8 further comprising instructions to:

lower the identification threshold when the person has been identified with a high confidence level as not carrying a weapon.

15. A non-transitory processor readable medium containing a set of instructions thereon that when executed by a processor cause the processor to:

receive, at an access control system, an indication of an identity of a person, the indication of the identity of the person including a confidence level of the identification;

receive, at a threat detection system, an indication of a threat level of the person, the threat level including a confidence level of the threat level;

modify at least one of an identification threshold based on the threat level confidence level or a threat level threshold based on the confidence level of the identification; and at least one of allow access, allow access with an alarm indication, or deny access to the person based in part on the modified identification threshold or threat level threshold.

16. The medium of claim 15 wherein the instructions to modify the at least one of the identification threshold and threat level threshold further comprises instructions to:

modify the at least one of the identification threshold and threat level threshold based on a context associated with the person.

17. The medium of claim 15 further comprising instructions to:

raise the identification threshold when the person has exceeded a default threat level threshold.

18. The medium of claim 17 further comprising instructions to:

raise the threat level threshold when the person has been identified with high confidence and is determined to be carrying a prohibited weapon.

19. The medium of claim 17 further comprising instructions to:

lower the threat level threshold when the person has been identified with high confidence and is determined to not be carrying an expected weapon.

20. The medium of claim 15 further comprising instructions to:

lower the identification threshold when the person has been identified with a high confidence level as not carrying a weapon.

* * * * *